United States Patent
Corso

(10) Patent No.: US 10,155,482 B2
(45) Date of Patent: Dec. 18, 2018

(54) COMBINATION CUP AND CELLULAR PHONE HOLDER ASSEMBLY FOR EFFECTIVELY HOLDING, MOUNTING, AND RETAINING A CELLULAR PHONE WITHIN A CUP HOLDER OF AN AUTOMOTIVE VEHICLE

(71) Applicant: Heath Corso, Oak Ridge, NC (US)

(72) Inventor: Heath Corso, Oak Ridge, NC (US)

( * ) Notice: Subject to any disclaimer, the term of this patent is extended or adjusted under 35 U.S.C. 154(b) by 0 days.

(21) Appl. No.: 15/624,830

(22) Filed: Jun. 16, 2017

(65) Prior Publication Data

US 2018/0001835 A1 Jan. 4, 2018

Related U.S. Application Data

(60) Provisional application No. 62/358,092, filed on Jul. 4, 2016, provisional application No. 62/358,094, filed on Jul. 4, 2016.

(51) Int. Cl.
| | |
|---|---|
| *H04B 1/3877* | (2015.01) |
| *B60R 11/02* | (2006.01) |
| *H04M 1/02* | (2006.01) |
| *B60N 3/10* | (2006.01) |
| *H02J 7/02* | (2016.01) |
| *H04M 1/04* | (2006.01) |
| *B60R 11/00* | (2006.01) |
| *H04M 1/21* | (2006.01) |

(52) U.S. Cl.
CPC .......... *B60R 11/0241* (2013.01); *B60N 3/103* (2013.01); *H02J 7/025* (2013.01); *H04B 1/3877* (2013.01); *H04M 1/0202* (2013.01); *H04M 1/04* (2013.01); *B60R 2011/0003* (2013.01); *B60R 2011/0007* (2013.01); *B60R 2011/0061* (2013.01); *B60R 2011/0071* (2013.01); *B60R 2011/0075* (2013.01); *H04M 1/21* (2013.01)

(58) Field of Classification Search
CPC ............................ B60R 11/0241; B60R 11/02
See application file for complete search history.

(56) References Cited

U.S. PATENT DOCUMENTS

| | | | | |
|---|---|---|---|---|
| 6,189,755 B1 * | 2/2001 | Wakefield | .............. | B60N 3/103 220/23.89 |
| 9,698,632 B2 * | 7/2017 | Davison | .................. | H02J 50/60 |
| 2012/0285907 A1 * | 11/2012 | Emmons | ................ | F16M 13/00 211/26 |

FOREIGN PATENT DOCUMENTS

KR  20140004901  *  9/2014  ............... B60N 3/10

* cited by examiner

*Primary Examiner* — Tuan H Nguyen
(74) *Attorney, Agent, or Firm* — Law Offices of Steven W. Weinrieb

(57) ABSTRACT

A combination cup and cellular phone holder assembly for holding and mounting a cellular phone within an automotive cup holder is disclosed wherein the cellular phone is always conveniently located with respect to the driver or passenger within the automotive vehicle cabin. The cup can be pivotally or rotationally moved, within the automotive cup holder, throughout a three hundred sixty degree (360°) volumetric space such that both the driver and passenger within the automotive vehicle cabin can readily view and access the cellular phone while the cellular phone will not interfere with the upstanding gear stick or gear shift shaft mounted upon the central console of the automotive vehicle. In addition, the cup itself can hold and contain a beverage cup, thereby effectively retaining the functional use of the cup holder.

16 Claims, 5 Drawing Sheets

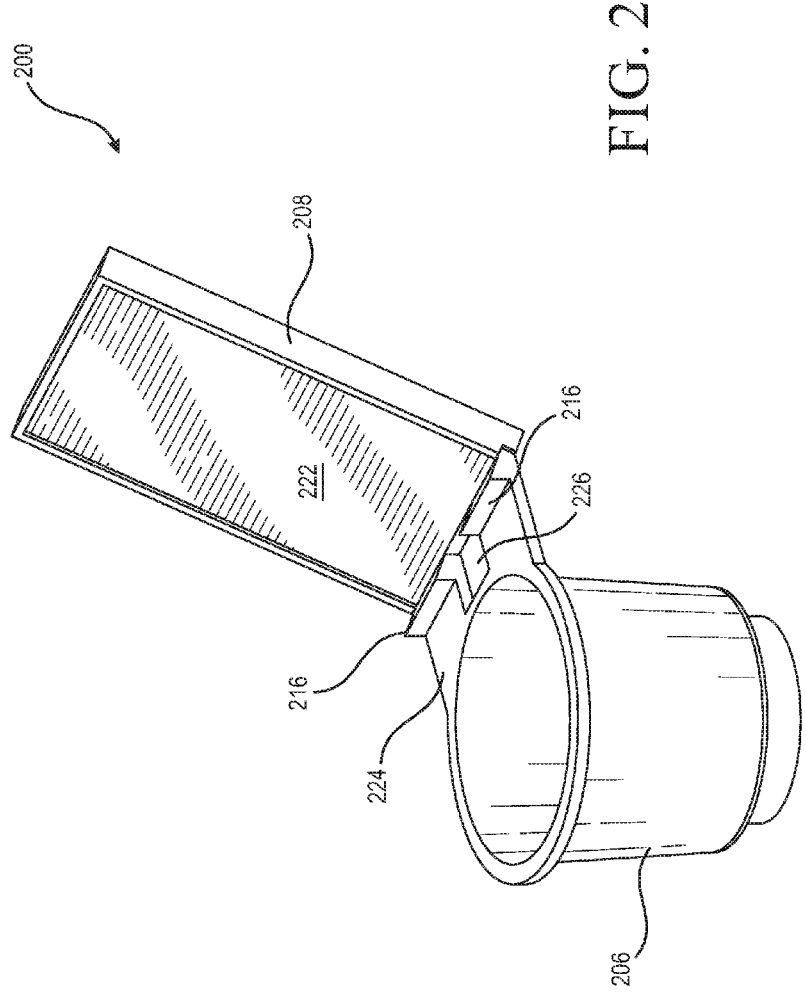

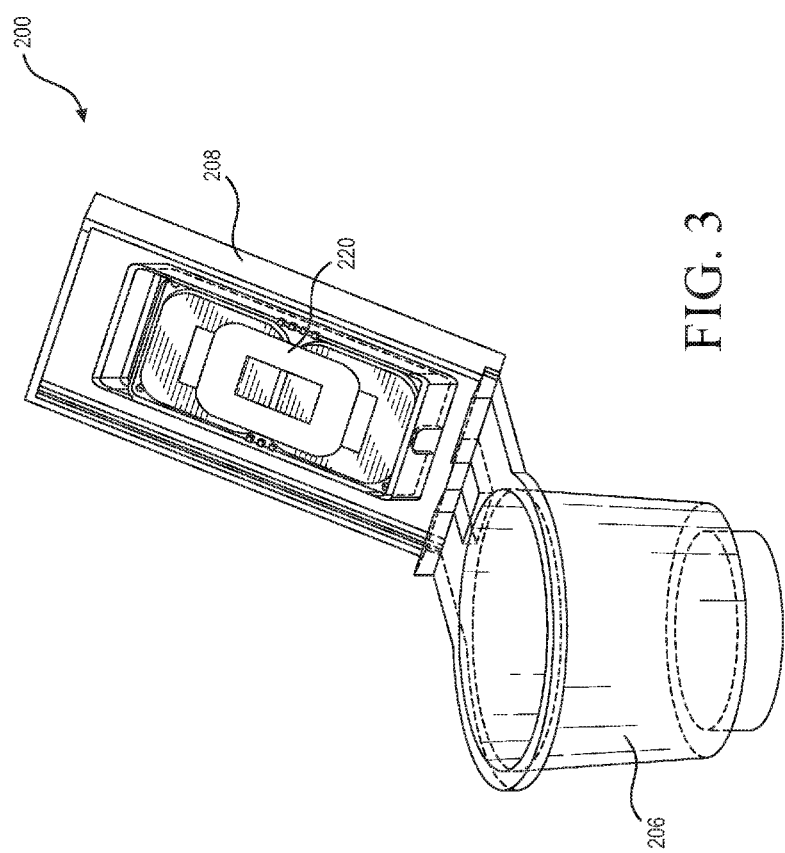

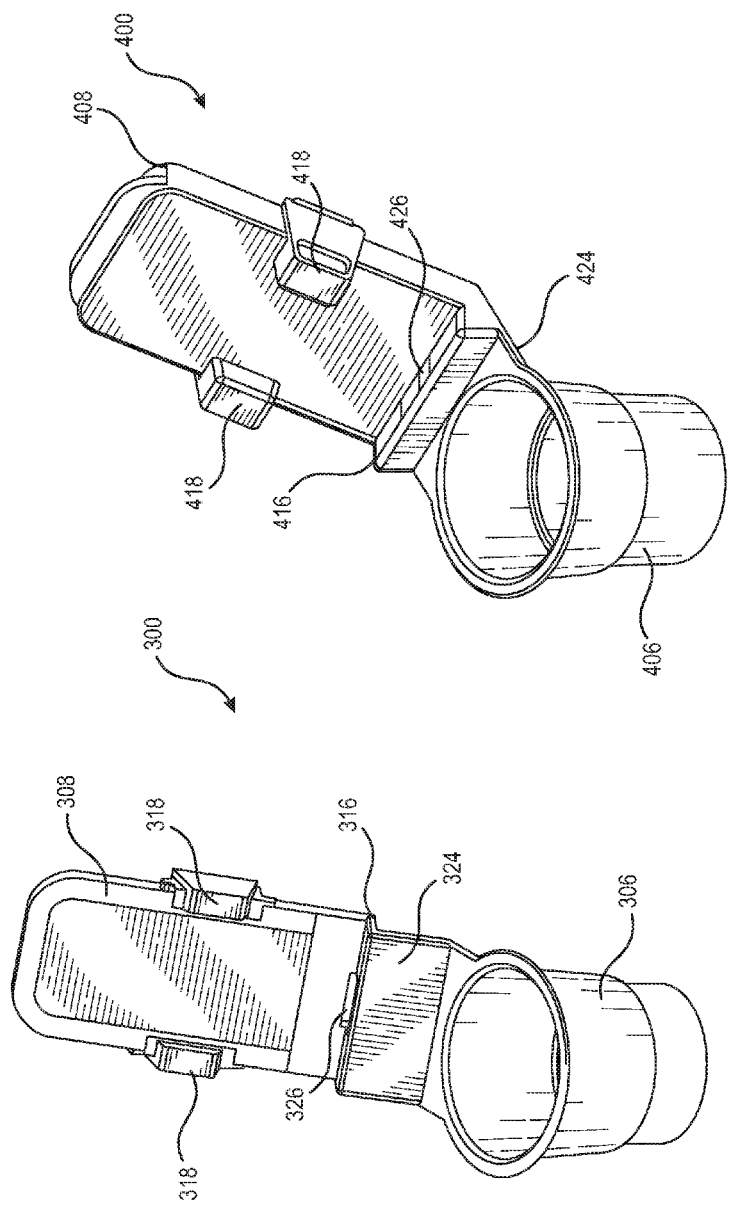

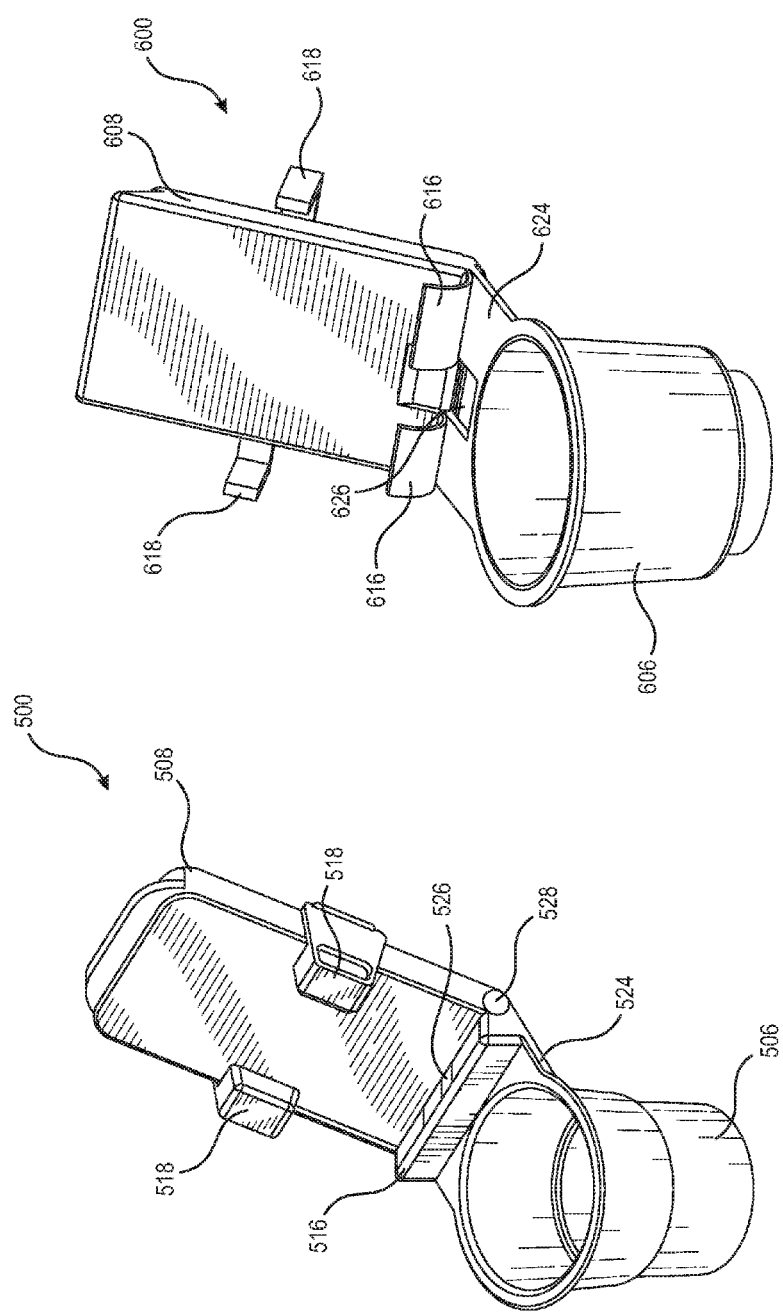

COMBINATION CUP AND CELLULAR PHONE HOLDER ASSEMBLY FOR EFFECTIVELY HOLDING, MOUNTING, AND RETAINING A CELLULAR PHONE WITHIN A CUP HOLDER OF AN AUTOMOTIVE VEHICLE

FIELD OF THE INVENTION

The present invention relates generally to cellular phone holders, and more particularly to a combination cup and cellular phone holder assembly for holding, mounting, and retaining a cellular phone within an automotive cup holder such that the cellular phone is always conveniently located with respect to the driver or passenger within the automotive vehicle cabin. The cup can be pivotally or rotationally moved, within the automotive cup holder, throughout a three hundred sixty degree (360°) volumetric space such that both the driver and passenger within the automotive vehicle cabin can readily view and access the cellular phone while the cellular phone will not interfere with the upstanding gear stick or gear shift shaft which is mounted upon the central console of the automotive vehicle. In addition, the cup itself can hold and contain a beverage cup, thereby effectively retaining the functional use of the cup holder. An electrical port can be incorporated within a rim portion of the cup or the base of the cell phone holder/cradle so as to provide an electrical connection for an electrical cable which will provide electrical power from the cigarette lighter or USB port, conventionally provided upon automotive vehicles, to a cellular phone wireless transmitter built into the cellular phone holder/cradle whereby the cellular phone can be wirelessly charged when it is seated or mounted upon the cell phone holder/cradle by means of a wireless receiver built into the cellular phone. Alternatively, for those cellular phones which are not adapted for wireless charging, the cellular phone can nevertheless be charged by means of a conventional cable being connected to the cellular phone, routing the cable through the rim portion of the cup or the base of the cell phone holder/cradle, and electrically connecting the cable to the cigarette lighter or USB port. The cell phone holder or cradle can also be pivotally attached to an extended rim portion of the cup so as to effectively dispose the cellular phone at any desirable angular orientation in order to facilitate or enhance the convenient viewing of and access to the cellular phone by the automotive driver or passenger.

BACKGROUND OF THE INVENTION

The use of cellular telephones has of course dramatically increased over the past ten years, so much so that a large majority of the population truly feel that they cannot be without, or out of touch with, their cellular phones for any extended period of time. They are constantly checking their cellular phones for incoming emails, texts, and the like. This is clearly evidenced by the fact that people often take their cellular phones with them into restaurants, movie theaters, and other public places, despite the fact that these various establishments usually require people to at least silence their cellular phones, if not completely turn them off. One place where such restrictions obviously do not apply is, for example, inside an automotive vehicle where the driver is of course in sole control of his/her cellular phone. On the other hand, prudence, as well as laws in various states of the United States, as well as in other countries, mandates that there be no hand-held cellular phone usage for either speaking or texting, in light of the fact that such usage constitutes a serious safety hazard, both to the driver and any passengers in his/her automotive vehicle, to other drivers and their passengers, and pedestrians. Accordingly, an entire industry has therefore developed in connection with providing cellular phone users with various devices for "holding" their cellular phones while driving so as to in fact permit, at least, hands-free talking. However, these various devices have had their operational or functional problems, rendering them less than desirable. For example, one problem that needed to be addressed was where to locate the device such that it could provide the desirable access to the driver while, on the other hand, not presenting a visual problem for the driver. Sometimes, people simply place their cellular phones within the cup holders provided within the automotive vehicles, however this has proven to be unsatisfactory in view of the fact that the cellular phone can move around within the cup holder and is therefore always not readily viewable by the driver. In addition, if the driver wants to operate the cellular phone on the electrical power provided by the automotive vehicle, in lieu of operating the cellular phone by means of its battery power, or if the driver wants to charge the cellular phone by means of the electrical power provided by the automotive vehicle, the cable, extending from the automotive cigarette lighter or USB port to the cellular phone, can become entangled or frayed over a period of time due to the necessary bending of the cable when it is attached to the cellular phone disposed within the cup holder.

Various cellular phone holders have therefore been designed to be mounted upon the horizontally oriented shelf overhanging the dashboard, or actually attached to a lower region of the front windshield, however, these devices obviously present a visual problem for the driver in that the cellular phone holder and the cellular phone potentially block a critical portion of the front windshield when the driver is looking in a particular direction or at a particular location. This problem could also become exacerbated when driving at night. Another type of cellular phone holder has been developed which is adapted to be mounted upon the air vent structures located upon the dashboard, however, again, this presents a problem in that the cellular phone holder and cellular phone interfere with the heat or cooled air flowing into the automotive passenger cabin. This potentially leads to the cabin becoming uncomfortable, at which point the driver may remove the cellular phone holder and cellular phone from its location upon the dashboard whereby the conundrum as to where to locate the cellular phone again arises. Still further, when the cellular phone and cellular phone holder are mounted upon the air vent structures within the dashboard, if you are utilizing a cable to operate or charge the cellular phone from the automotive cigarette lighter or USB port, the cable is often in front of the audio equipment so if you want to make any adjustments to the audio components, such as for example, changing the channel, changing the volume, or to change between different play modes, such as CD, conventional radio, or satellite radio, the cable comprises a nuisance interfering with your audio selections.

A need therefore exists in the art for a new and improved cellular phone holder which will effectively overcome the aforenoted deficiencies noted in connection with conventional cellular phone-holders. Another need exists in the art for a new and improved cellular phone holder which will provide easy and ready access to the cellular phone while permitting the automotive vehicle driver to operate and communicate by means of the cellular phone without the cellular phone comprising a hazard with respect to the safe operation of the automotive vehicle. Still another need exists in the art for a new and improved cellular phone holder wherein the holder and cellular phone will not present any visual problems or difficulties for the automotive vehicle driver. Yet another need exists in the art for a new and improved cellular phone holder wherein the cellular phone is positionally secured within the cellular phone holder such that the cellular phone is not permitted to freely move once adjusted to a particular orientation relative to the automotive vehicle driver so as to avoid the need for the automotive vehicle driver to re-position the cellular phone to an accessible disposition. Still yet another need exists in the art for a new and improved cellular phone holder which accommodates the usage of a charging cable, connected to the automotive cigarette lighter or USB port, to be employed in connection with the cellular phone such that the cellular phone can operate upon the automotive vehicle power or be charged by means of the automotive vehicle power whether or not the cellular phone is actually being utilized. Yet still another need exists in the art for a new and improved cellular phone holder which accommodates the usage of a charging cable to be employed in connection with the cellular phone wherein the charging cable will not become entangled with or obstruct other appointments present upon the automotive dashboard. A further need exists in the art for a new and improved cellular phone holder which accommodates the usage of a charging cable to be employed in connection with the cellular phone wherein the cable is not forced to be bent at undesirable angles which can lead to the fraying of the cable. A yet further need exists in the art for a new and improved cellular phone holder which accommodates the usage of a charging cable to be employed in connection with the cellular phone wherein the charging cable will not interfere with the flow of heated and conditioned air into the automotive vehicle cabin.

OVERALL OBJECTIVES OF THE INVENTION

Therefore, one of the overall objectives of the present invention is to provide a new and improved cellular phone holder which will effectively overcome the aforenoted deficiencies noted in connection with conventional cellular phone-holding devices. Another overall object of the present invention is to provide a new and improved cellular phone holder which will provide easy and ready access to the cellular phone while permitting the automotive vehicle driver to operate and communicate by means of the cellular phone without the cellular phone comprising a hazard with respect to the safe operation of the automotive vehicle. Still another overall object of the present invention is to provide a new and improved cellular, phone holder wherein the holder and cellular phone will not present any visual problems or difficulties for the automotive vehicle driver. Yet another overall object of the present invention is to provide a new and improved cellular phone holder wherein the cellular phone is positionally secured within the cellular phone holder such that the cellular phone is not permitted to freely move once adjusted to a particular orientation relative to the automotive vehicle driver so as to avoid the need for the automotive vehicle driver to re-position the cellular phone to a new accessible disposition. Still yet another overall object of the present invention is to provide a new and improved cellular phone holder which accommodates the usage of a charging cable, connected to the automotive cigarette lighter or USB port, to be employed in connection with the cellular phone such that the cellular phone can operate upon the automotive vehicle power or be charged by means of the automotive vehicle power whether or not the cellular phone is actually being utilized. Yet still another overall object of the present invention is to provide a new and improved cellular phone holder which accommodates the usage of a charging cable to be employed in connection with the cellular phone wherein the charging cable will not become entangled with or obstruct other appointments present upon the automotive dashboard. A further overall object of the present invention is to provide a new and improved cellular phone holder which accommodates the usage of a charging cable to be employed in connection with the cellular phone wherein the cable is not forced to be bent at undesirable angles which can lead to the fraying of the cable. A yet further overall object of the present invention is to provide a new and improved cellular phone holder which accommodates the usage of a charging cable to be employed in connection with the cellular phone wherein the charging cable will not interfere with the flow of heated and conditioned air into the automotive vehicle cabin.

SUMMARY OF THE INVENTION

The foregoing and other objectives are achieved in accordance with the teachings and principles of the present invention through the provision of a new and improved combination cup and cellular phone holder assembly for holding and mounting a cellular phone within a cup holder of an automotive vehicle wherein the cup of the combination cup and cellular phone holder assembly for holding, mounting, and retaining the cellular phone is substantially cylindrical so as to readily capable of being disposed within the cup holder conventionally provided within the automotive vehicle. In this manner, the cup not only effectively retains the operative use of the cup holder in that the cup per se can now accommodate a beverage cup, but in addition, the cup is rotatably movable through a 360° range of movement within the automotive cup holder such that when the cellular phone is attached to the cellular phone holder, as a result of being mounted upon the cellular phone holder portion of the combination cup and cellular phone holder assembly, the cellular phone may be operably moved to any angular position that is easy and readily selected by means of the automotive vehicle driver or passenger so that the cellular phone can be easily and readily viewed by the automotive vehicle driver or passenger. Still further, in accordance with another embodiment of the present invention, a built-in wireless charger is incorporated within the cellular phone holder of the combination cup and cellular phone holder assembly, and a jack for accommodating one end of a charging cable, having its other end electrically connected to the automotive cigarette lighter or USB port, is effectively built into a rim portion of the cup. Alternatively still further, if one's cellular phone is not wireless-charging enabled, an aperture is defined within a horizontally or vertically oriented rim extension of the cup, or within the lower support section of the cellular phone holder of the combination cup and cellular phone holder assembly and can easily pass therethrough without forcing the charging cable to undergo being bent at acute angles which could lead to fraying of the charging cable. Still yet further, and in accordance with yet another embodiment of the present invention, the cellular phone holder of the combination cup and cellular phone holder assembly can effectively be pivotally connected with respect to the cup of the combination cup and the cellular phone holder assembly such that the substantially vertical orientation of the cellular phone holder of the combination cup and attachment assembly, upon which the cellular phone is mounted, can be pivotally altered so the cellular phone can effectively be viewed from any one of a multitude of viewing angles or perspectives by the automotive vehicle driver or passenger.

BRIEF DESCRIPTION OF THE DRAWINGS

Various other features and attendant advantages of the present invention will be more fully appreciated from the following detailed description when considered in connection with the accompanying drawings in which like reference characters designate like or corresponding parts throughout the several views, and wherein:

FIG. 2 is a perspective view of a second embodiment of a new and improved combination cup and cellular phone holder assembly for mounting a cellular phone wherein, in this embodiment, there is provided a built-in wireless charging unit, however, a face plate is covering the wireless charging unit which is housed internally within the cellular phone holder of the combination cup and cellular phone holder assembly, and wherein further, a horizontally oriented cup rim extension is provided with a suitable aperture so as to permit the jack of a charging cable to extend therethrough;

FIG. 3 is a perspective view of the second embodiment of a new and improved combination cup and cellular phone holder assembly for mounting a cellular phone thereon, as disclosed within FIG. 2, wherein the face plate of the cellular phone holder of the combination cup and cellular phone holder assembly has been removed so as to disclose the wireless charging unit disposed internally within the cellular phone holder of the combination cup and cellular phone holder assembly;

FIG. 4 is a perspective view of a third embodiment of a new and improved combination cup and cellular phone holder assembly for mounting a cellular phone thereon, wherein a vertically oriented extension of the rim portion of the cup is provided with a suitable aperture formed therewithin so as to permit the jack of a charging cable to extend therethrough, and wherein further, side edge portions of the cellular phone holder of the combination cup and cellular phone holder assembly are provided with a pair of oppositely disposed retention members so as to effectively fixedly secure the cellular phone in position as mounted upon the cellular phone holder of the combination cup and cellular phone holder assembly, in a manner similar to that of the first embodiment illustrated within FIG. 1;

FIG. 5 is a perspective view of a fourth embodiment of a new and improved combination cup and cellular phone holder assembly for mounting a cellular phone thereon, wherein a suitable aperture is provided within a lower edge or base portion of the cellular phone holder of the combination cup and cellular phone holder assembly so as to enable the jack end portion of a charging cable to be inserted therethrough;

FIG. 6 is a perspective view of a fifth embodiment of a new and improved combination cup and cellular phone holder assembly for mounting a cellular phone thereon wherein the combination cup and cellular phone holder assembly is substantially similar to the combination cup and cellular phone holder assembly as disclosed within FIG. 5, however, in this embodiment, the cellular phone holder of the combination cup and cellular phone holder assembly is pivotally mounted with respect to the cup so as to be pivotally moved to any one of various angular orientations and thereby selectively provide the driver or passenger with an optimum viewing angle or perspective; and FIG. 7 is a perspective view of a sixth embodiment of a new and improved combination cup and cellular phone holder assembly for mounting a cellular phone thereon, wherein the cellular phone retention members, mounted upon the side edge portions of the cellular phone holder of the combination cup and cellular phone holder assembly, are laterally adjustable so as to permit the combination cup and cellular phone holder assembly to be utilized in conjunction with differently sized cellular phones.

DETAILED DESCRIPTION OF THE PREFERRED EMBODIMENT

Figure 1:
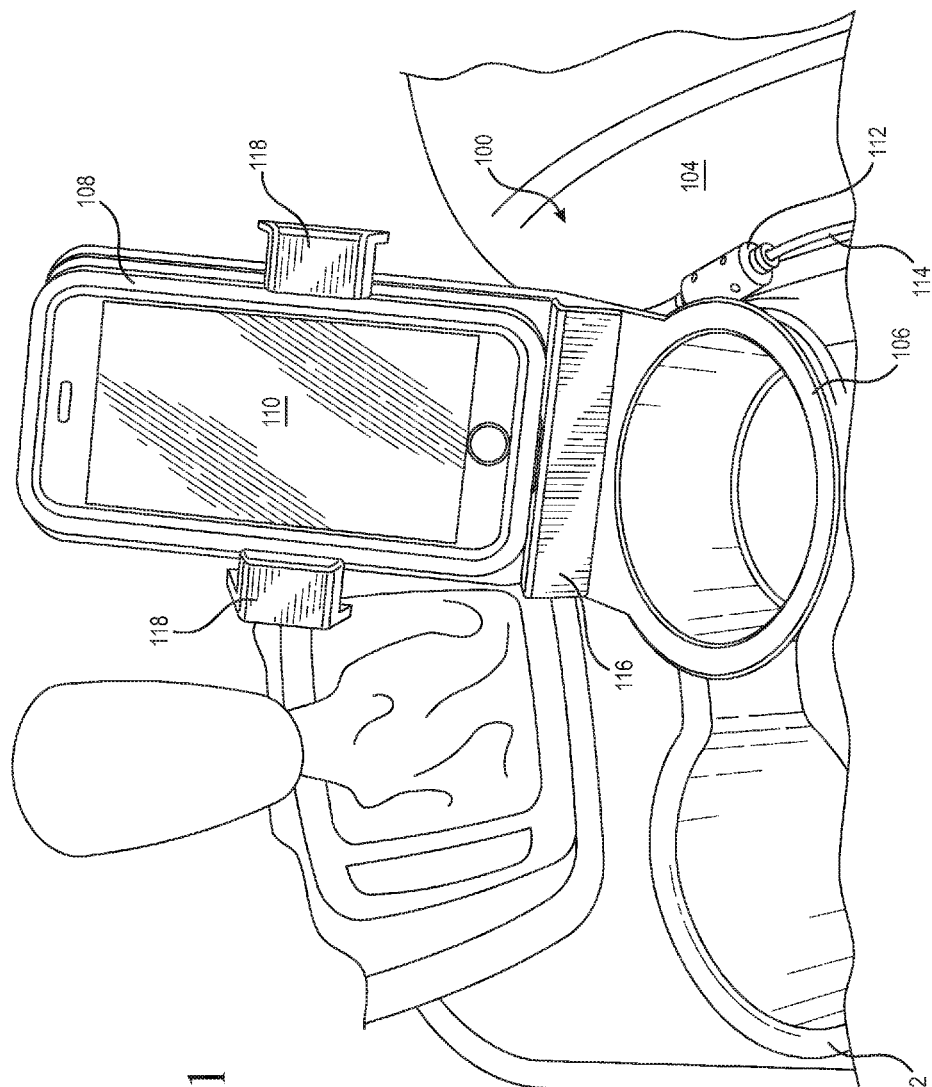
FIG. 1 is a perspective view illustrating the interior of an automotive vehicle wherein it can be seen that a first embodiment of a new and improved combination cup and cellular phone holder assembly, constructed in accordance with the principles and teachings of the present invention for holding a cellular phone, is disposed within one of the cup holders provided within the automotive vehicle cabin wherein the cup member of the combination cup and cellular phone holder assembly is disposed within the cup holder and yet can still be utilized to accommodate a beverage cup, while the cellular phone holder of the combination cup and cellular phone holder assembly has a cellular phone mounted thereon in an angled orientation that can be easily and readily viewed by the driver of the automotive vehicle, and wherein further, a jack is provided upon a side wall portion of the cup so as to accommodate one end of a charging cable.

Referring now to the drawings, and more particularly to FIG. 1 thereof, there is disclosed a first embodiment of a new and improved combination cup and cellular phone holder assembly which has been constructed in accordance with the principles and teachings of the present invention, which is adapted to hold a cellular phone, and which is generally indicated by the reference character 100. More particularly, it is seen that the combination cup and cellular phone holder assembly 100 is disposed within one of the cup holders 102 provided within the automotive vehicle cabin 104 wherein the cup member 106 of the combination cup and cellular phone holder assembly 100 is substantially cylindrical so as to be disposed within one of the cup holders 102 and yet can still be utilized to accommodate a beverage cup, not illustrated, while the cellular phone holder 108 of the combination cup and cellular phone holder assembly 100 has a cellular phone 110 mounted thereon in an angled orientation that can be easily and readily viewed by the driver of the automotive vehicle. In addition, an electromagnetic interference filter 112 is provided upon a charging cable 114 such that the charging cable 114, having its opposite end plugged into the cigarette lighter or USB port, not shown, which is conventionally provided within automotive vehicles, can be utilized to supply electrical power to a wireless charging unit built into the cellular phone 110, in 20, the instance that the cellular phone 110 is provided with such capabilities, or alternatively, the electrical power can be utilized to power the cellular phone 110 when the cellular phone 110 is actually being used or to charge the cellular phone 110 when the cellular phone 110 is not actually being used but is simply being held within the cellular phone holder 108 of the combination cup and cellular phone holder assembly 100. As has been noted, the cup 106 of the combination cup and cellular phone holder 100 for holding and mounting the cellular phone 110 is substantially cylindrical so as to be readily capable of being disposed within the cup holder 102 conventionally provided within the automotive vehicle, however, in addition, the cup 106 not only effectively retains the operative use of the cup holder 102 in that the cup 106 per se can now accommodate a beverage cup, not shown, but the cup is rotatably movable through a 360° range of movement within the automotive cup holder 102 such that when the cellular phone 110 is attached thereto, as a result of being mounted upon the cellular phone holder 108 of the combination cup and cellular phone holder assembly 100, the cellular phone 110 may be operably moved to any angular position that is selected by means of the automotive vehicle driver or passenger so that the cellular phone 110 can be easily and readily viewed by the automotive vehicle driver or passenger. It is further noted that the lower end portion of the cellular phone holder 108 of the combination cup and cellular phone holder assembly 100 is provided with a horizontally oriented shelf or ledge 116 upon which the lower or bottom end portion of the cellular phone 110 rests or is supported, and still further, a pair of retention members 118,118 are disposed upon the side edge portions of the cellular phone holder 108 of the combination cup and cellular phone holder assembly 100 so as to effectively preclude the cellular phone 110 from becoming disengaged from the cellular phone holder or cradle 108 of the combination cup and cellular phone holder assembly 100.

With reference now being made to FIGS. 2 and 3, a second embodiment of a combination cup and cellular phone holder assembly for holding a cellular phone is disclosed and is generally indicated by the reference character 200. It is to be noted that the second embodiment combination cup and attachment member assembly 200 is effectively similar to the first embodiment combination cup and cellular phone holder assembly 100, except as will be specifically noted hereinafter, and therefore, for brevity purposes, only those component parts of the second embodiment combination cup and cellular phone holder assembly 200 which differ from the component parts of the first embodiment cup and cellular phone holder assembly 100 will be discussed. In addition, it is also noted that those component parts of the second embodiment combination cup and cellular phone holder assembly which correspond to component parts of the first embodiment cup and cellular phone holder assembly 100 will be designated by corresponding reference numbers except that they will be within the 200 series. More particularly, it is seen that a triple-coil wireless charging unit 220, as can best be seen in FIG. 3, is provided internally of the cellular phone holder 208 of the second embodiment combination cup and cellular phone holder assembly 200, and that the cellular phone holder 208 of the second embodiment combination cup and cellular phone holder assembly 200 is provided with a face plate 222 which normally covers the triple-coil wireless charging unit 220. It is also noted that in lieu of the continuous shelf or ledge 116 characteristic of the first embodiment of the cellular phone holder 108 of the first embodiment cup and attachment member assembly 100, the shelf or ledge portion of the cellular phone holder 208 of the second embodiment cup and cellular phone holder assembly 200 comprises two horizontally spaced shelf or ledge portions 216,216. In addition, it is noted that the cup 206 of the second embodiment cup and cellular phone holder assembly 200 is provided with a horizontally oriented rim extension 224 within which there is defined a through-aperture 226 for accommodating the jack and/or the charging cable, not shown, so that electrical power can be supplied to the triple-coil wireless charging unit 220.

With reference now being made to FIG. 4, a third embodiment of a combination cup and cellular phone holder assembly for holding a cellular phone is disclosed and is generally indicated by the reference character 300. It is to be noted that the third embodiment cup and cellular phone holder assembly 300 is effectively similar to the first and second embodiment cup and cellular phone holder assemblies 100,200, except as will be specifically noted hereinafter, and therefore, for brevity purposes, only those component parts of the third embodiment cup and cellular phone holder assembly 300 which differ from the component parts of the first and second cup and cellular phone holder assemblies 100,200 will be discussed. In addition, it is also noted that those component parts of the third embodiment cup and cellular phone holder assembly 300 which correspond to component parts of the first and second embodiment cup and cellular phone holder assemblies 100, 200 will be designated by corresponding reference numbers except that they will be within the 300 series. More particularly, it is seen that in lieu of the horizontally oriented rim extension integrally connected to the cup, the third embodiment cup and attachment member assembly 300 comprises a vertically oriented rim extension 324 which is integrally connected to the cup 306. In addition, the horizontally oriented shelf or ledge portion 316 of the cellular phone holder 308 of the third embodiment cup and cellular phone holder assembly 300 is provided with a through-aperture 326 for permitting the passage therethrough of an end portion of a charging cable and/or the terminal jack portion thereof. It is to be noted that as a result of providing the vertically oriented rim extension 324, in lieu of the horizontally oriented rim extension 224 as illustrated within the second embodiment cup and cellular phone assembly 200, additional linear distance is effectively provided for the routing of the charging cable such that the charging cable is not forced to undergo any severe bending while being connected to the cellular phone in order to power or charge the same. This enhanced linear routing of the charging cable effectively prevents the charging cable from becoming frayed which leads to an enhanced service life of the charging cable.

With reference now being made to FIG. 5, a fourth embodiment of a cup and cellular phone holder assembly for holding a cellular phone is disclosed and is generally indicated by the reference character 400. It is to be noted that the third embodiment cup and cellular phone holder assembly 400 is effectively similar to the first, second, and third embodiment cup and cellular phone holder assemblies 100, 200,300 except as will be specifically noted hereinafter, and therefore, for brevity purposes, only those component parts of the fourth embodiment cup and cellular phone holder assembly 400 which differ from the component parts of the first, second, and third cup and cellular phone holder assemblies 100,200,300 will be discussed. In addition, it is also noted that those component parts of the fourth embodiment cup and cellular phone holder assembly 400 which correspond to component parts of the first, second, and third embodiment cup and cellular phone holder assemblies 100, 200,300 will be designated by corresponding reference numbers except that they will be within the 400 series. More particularly, it is seen that the fourth embodiment of a cup and cellular phone holder assembly 400 for holding a cellular phone is especially similar to the first embodiment cup and cellular phone holder assembly 100 except that the through-aperture 426, for permitting the passage of the charging cable and/or its terminal jack to pass therethrough, is defined within the support shelf or ledge 416 of the cellular phone holder 408 of the cup and attachment member assembly 400.

With reference now being made to FIG. 6, a fifth embodiment of a cup and cellular phone holder assembly for holding a cellular phone is disclosed and is generally indicated by the reference character 500. It is to be noted that the fifth embodiment cup and cellular phone holder assembly 500 is effectively similar to the first, second, third, and fourth embodiment cup and attachment member assemblies 100,200,300,400 except as will be specifically noted hereinafter, and therefore, for brevity purposes, only those component parts of the fifth embodiment cup and cellular phone holder assembly 500 which differ from the component parts of the first, second, third, and fourth cup and cellular phone holder assemblies 100, 200,300,400 will be discussed. In addition, it is also noted that those component parts of the fifth embodiment cup and cellular phone holder assembly 500 which correspond to component parts of the first, second, third, and fourth embodiment cup and cellular phone holder assemblies 100,200,300,400 will be designated by corresponding reference numbers except that they will be within the 500 series. More particularly, it is seen that the fifth embodiment of a cup and cellular phone holder assembly 500 for holding a cellular phone is especially similar to the fourth embodiment cup and cellular phone holder assembly 400 except that in lieu of the cellular phone holder 508 being fixedly connected to the rim extension portion 524 of the cup 506, the cellular phone holder 508 is pivotally connected to the rim extension portion 524 by means of a suitable pivot mechanism 528. In this manner, in addition to the cup 506 being freely rotatable within the cup holder of the automotive vehicle cabin in order to effectively provide the driver or passenger with readily convenient viewing and access to the cellular phone, the pivotal movement of the cellular phone holder 508 relative to the cup 506 further permits the driver or passenger within the automotive vehicle to adjust the angular disposition of the cellular phone holder 508 with respect to the cup 506 and therefore the angular disposition of the cellular phone being held or cradled upon the cellular phone holder 508 so as to further enhance the convenience of viewing or accessing the cellular phone by means of the automotive vehicle driver or passenger.

Lastly, with reference now being made to FIG. 7, a sixth embodiment of a cup and cellular phone holder assembly for holding a cellular phone is disclosed and is generally indicated by the reference character 600. It is to be noted that the sixth embodiment cup and cellular phone holder assembly 600 is effectively similar to the first, second, third, fourth, and fifth embodiment cup and cellular phone holder assemblies 100,200,300,400,500 except as will be specifically noted hereinafter, and therefore, for brevity purposes, only those component parts of the sixth embodiment cup and cellular phone holder assembly 600 which differ from the component parts of the first, second, third, fourth, and fifth cup and cellular phone holder assemblies 100,200,300,400, 500 will be discussed. In addition, it is also noted that those component parts of the sixth embodiment cup and cellular phone holder assembly 600 that correspond to component parts of the first, second, third, fourth, and fifth embodiment cup and cellular phone holder assemblies 100,200, 300,400, 500 will be designated by corresponding reference numbers except that they will be within the 600 series. More particularly, it is seen that the sixth embodiment of a cup and cellular phone holder assembly 600 for holding a cellular phone is somewhat similar to the second embodiment cup and cellular phone holder assembly 200 in that there is provided a pair of horizontally spaced shelf or ledge members 616,616 upon which the lower end portion of the cellular phone will rest or be supported, however, it is noted that the shelf or ledge members 616,616 of this sixth embodiment cup and cellular phone holder assembly 600 have arcuate structural configurations. In addition, and more importantly, it is to be noted that in accordance with this sixth embodiment cup and cellular phone holder assembly 600, the pair of retention members 618,618 mounted upon the opposite side edge portions of the cellular phone holder 608 are laterally adjustable whereby the cellular phone holder 608 may in fact accommodate different cellular phones which may have different width dimensions.

Obviously, many variations and modifications of the present invention are possible in light of the above teachings. It is therefore to be understood that within the scope of the appended claims, the present invention may be practiced otherwise than as specifically described herein.

REFERENCE NUMBER KEY

100—Combination cup and attachment member for mounting a cellular phone
102—Automotive vehicle cup holder
104—Interior cabin of automotive vehicle
106—Cup of combination cup and attachment member 100
108—Attachment member of combination cup and attachment member 100
110—Cellular phone mounted upon attachment member 108
112—Electromagnetic interference filter for cellular phone charging cable
114—Charging cable operatively associated with filter 112
116—Horizontal shelf or ledge of attachment member 108 for lower end of phone
118—Retention members upon opposite side edge portions of attachment member
200—Second embodiment combination cup and attachment member
206—Cup of second member combination
208—Attachment member of second embodiment combination
216—Pair of shelf or ledge members of attachment member 208
220—Triple-coil wireless charger
222—Face plate covering attachment member 208
224—Horizontal extension member of cup 206
226—Aperture defined within horizontal extension member 224
300—Third embodiment combination cup and attachment member
306—Cup of third embodiment combination
308—Attachment member of third embodiment combination
316—Shelf or ledge member of attachment member 308
318—Retention members upon opposite side edge portions of attachment member
324—Vertical extension member of cup 206
326—Aperture defined within horizontal shelf or ledge member 316
400—Fourth embodiment combination cup and attachment member
406—Cup of fourth embodiment combination
408—Attachment member of fourth embodiment combination
416—Shelf or ledge member of attachment member 408
418—Retention members of attachment member 408
424—Horizontal extension member of cup 406
426—Aperture defined within horizontal shelf or ledge member 416
500—Fifth embodiment combination cup and attachment member 506—Cup of fifth embodiment combination
508—Attachment member of fifth embodiment combination
516—Shelf or ledge member of attachment member 508
518—Retention members of attachment member 508
524—Horizontal extension member of cup 506
526—Aperture defined within horizontal shelf or ledge member 616
528—Pivot mechanism pivotally connecting attachment member 528 to horizontal extension member 524
600—Sixth embodiment combination cup and attachment member
606—Cup of sixth embodiment combination
608—Attachment member of sixth embodiment combination
616—Shelf or ledge members of attachment member 608
618—Laterally adjustable retention members of attachment member 608
624—Horizontal extension member of cup 606
626—Aperture defined within horizontal shelf or ledge member 616

What is claimed as new and desired to be protected by Letters Patent is:

1. In combination, a cup and cellular phone holder assembly for holding and mounting a cellular phone within a cup holder of an automotive vehicle, comprising:
   a cup adapted to be inserted into a cup holder provided within an automotive vehicle, said cup comprising a bottom wall and an upstanding annular wall fixedly secured to said bottom wall and having a predeterminedly fixed diametrical extent so as to be disposed within the cup holder of the automotive vehicle and thereby effectively replace the cup holder of the automotive vehicle as the functional cup holder within the automotive vehicle, wherein an upper portion of said upstanding annular wall defines an annular rim portion of said cup; and
   a cellular phone holder having a base portion thereof fixedly connected to said upper annular rim portion of said cup so as to define with said cup a one-piece structure, and wherein said cellular phone holder is disposed at a predetermined upwardly inclined angle with respect to said cup for mounting a cellular phone thereon which can be readily visible by a driver or passenger of the vehicle,
   wherein said cup is disposed in a freely rotatable state within the cup holder of the automotive cup holder through a range of 360° so as to enable a driver or passenger of the automotive vehicle to angularly position the cellular phone, mounted upon said cellular phone holder, to any predetermined angular position relative to the cup holder of the automotive vehicle so as to provide the driver or passenger of the automotive vehicle with unrestricted viewing and access to the cellular phone mounted upon said cellular phone holder as a result of the disposition of the cellular phone upon said cellular phone holder and the predetermined upwardly inclined disposition of said cellular phone holder with respect to said cup.

2. The combination as set forth in claim 1, wherein:
   said cup of said combination cup and cellular phone holder, while disposed within the cup holder of the automotive vehicle, can hold a beverage cup therewithin.

3. The combination as set forth in claim 1, further comprising:
   a wireless charging unit incorporated within said cellular phone holder for permitting wireless charging of the cellular phone when the cellular phone is mounted upon said cellular phone holder.

4. The combination as set forth in claim 3, wherein:
   said wireless charging unit comprises a triple-coil wireless charging unit.

5. The combination as set forth in claim 3, further comprising:
   a jack fixedly connected to a rim portion of said cup for permitting a charging cable to be connected to said combination cup and cellular phone holder so as to provide electrical power to said wireless charging unit incorporated within said cellular phone holder.

6. The combination as set forth in claim 1, further comprising:
   a horizontally oriented extension member fixedly connected to a rim portion of said cup by means of which said cellular phone holder is fixedly connected to said cup.

7. The combination as set forth in claim 6, further comprising:
   said cellular phone holder is provided with a horizontally oriented shelf or ledge member upon which a lower portion of the cellular phone is adapted to be supported when the cellular phone is mounted upon said cellular phone holder, and said horizontally oriented shelf or ledge member of said cellular phone holder is fixedly attached to said horizontally oriented extension member fixedly connected to said cup.

8. The combination as set forth in claim 7, further comprising:
   an aperture defined within said horizontally oriented shelf or ledge member fixedly attached to said rim portion of said cup for permitting a charging cable and/or jack to pass therethrough in order to recharge the cellular phone.

9. The combination as set forth in claim 6, further comprising:
   an aperture defined within said horizontally oriented extension member connected to said rim portion of said cup for permitting a charging cable and/or jack to pass therethrough in order to recharge the cellular phone.

10. The combination as set forth in claim 9, wherein:
    said cellular phone holder is provided with a horizontally oriented shelf or ledge comprising a pair of laterally spaced shelf or ledge members upon which a lower portion of the cellular phone is adapted to be supported when the cellular phone is mounted upon said cellular phone holder, said pair of laterally spaced shelf or ledge members being spaced apart from each other so as to permit the charging cable and/or jack to pass between said pair of laterally spaced shelf or ledge members.

11. The combination as set forth in claim 1, further comprising:
    said cellular phone holder is provided with a horizontally oriented shelf or ledge member upon which a lower portion of the cellular phone is adapted to be supported when the cellular phone is mounted upon said cellular phone holder.

12. The combination as set forth in claim 1, further comprising:
    a vertically oriented extension member fixedly attached to a rim portion of said cup by means of which said cellular phone holder is fixedly connected to said cup.

13. The combination as set forth in claim 12, further comprising:
    said cellular phone holder is provided with a horizontally oriented shelf or ledge member, fixedly connected to said vertically oriented extension member fixedly connected to said rim portion of said cup, upon which a lower portion of the cellular phone is adapted to be supported when the cellular phone is mounted upon said cellular phone holder.

14. The combination as set forth in claim 13, further comprising:
an aperture defined within said horizontally oriented shelf or ledge member fixedly attached to said vertically oriented extension member for permitting a charging cable and/or jack to pass therethrough in order to recharge the cellular phone.

15. The combination as set forth in claim 1, further comprising:
a pair of retention members provided upon opposite side edge portions of said cellular phone holder for securely retaining the cellular phone at its mounted position upon said cellular phone holder.

16. The combination as set forth in claim 15, wherein:
said pair of retention members provided upon said opposite side edge portions of said cellular phone holder are laterally adjustable so as to securely retain different cellular phones having different width dimensions upon said cellular phone holder.

\* \* \* \* \*